United States Patent
Young et al.

(10) Patent No.: US 9,200,177 B2
(45) Date of Patent: Dec. 1, 2015

(54) ALKYD DISPERSION, AND A PROCESS FOR PRODUCING THE SAME

(75) Inventors: Timothy J. Young, Bay City, MI (US);
Gary E. Spilman, Midland, MI (US);
Suresh Subramonian, Cary, NC (US);
Ray E. Drumright, Midland, MI (US);
David D. Mall, Apex, NC (US);
Rosemarie Lauer, Chalfont, PA (US);
Andrea Greyson, Blue Bell, PA (US);
Robert Sandoval, Midland, MI (US);
Ahmad Madkour, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 194 days.

(21) Appl. No.: 13/498,264

(22) PCT Filed: Nov. 1, 2010

(86) PCT No.: PCT/US2010/054952
§ 371 (c)(1),
(2), (4) Date: Mar. 26, 2012

(87) PCT Pub. No.: WO2011/053904
PCT Pub. Date: May 5, 2011

(65) Prior Publication Data
US 2012/0244288 A1 Sep. 27, 2012

Related U.S. Application Data

(60) Provisional application No. 61/256,389, filed on Oct. 30, 2009.

(51) Int. Cl.
| | | |
|---|---|---|
| B05D 7/24 | (2006.01) |
| C09D 191/00 | (2006.01) |
| C09D 167/08 | (2006.01) |
| C08J 3/03 | (2006.01) |
| C08J 3/05 | (2006.01) |
| C09D 5/02 | (2006.01) |

(52) U.S. Cl.
CPC .......... *C09D 167/08* (2013.01); *C08J 3/03* (2013.01); *C08J 3/05* (2013.01); *C09D 5/022* (2013.01); *C08J 2367/08* (2013.01); *Y10T 428/31786* (2015.04); *Y10T 428/31938* (2015.04)

(58) Field of Classification Search
CPC .............................. B05D 7/24; C09D 191/00
USPC ................ 427/385.5; 524/601, 378, 375, 156
See application file for complete search history.

(56) References Cited

U.S. PATENT DOCUMENTS

| | | |
|---|---|---|
| 3,269,967 A | 8/1966 | Broadhead |
| 3,440,193 A | 4/1969 | Campagna |
| 4,271,051 A | 6/1981 | Eschwey |
| 4,271,851 A * | 6/1981 | Dubuque .................. 131/94 |
| 4,599,392 A | 7/1986 | McKinney et al. |
| 4,988,781 A | 1/1991 | McKinney et al. |
| 5,539,021 A | 7/1996 | Pate et al. |
| 5,552,475 A | 9/1996 | Sundararaman et al. |
| 5,688,842 A | 11/1997 | Pate, III et al. |
| 5,938,437 A | 8/1999 | DeVincenzo |
| 6,388,002 B1 | 5/2002 | Baker et al. |
| 6,469,096 B1 | 10/2002 | Urbano et al. |
| 6,613,817 B2 | 9/2003 | Bouvy et al. |
| 6,780,910 B2 | 8/2004 | Bouvy et al. |
| 6,887,909 B2 | 5/2005 | Kawamura et al. |
| 2005/0201927 A1 | 9/2005 | Flynn et al. |
| 2006/0078485 A1 | 4/2006 | Thiele et al. |
| 2008/0188588 A1 | 8/2008 | Sullivan et al. |

FOREIGN PATENT DOCUMENTS

| | | |
|---|---|---|
| DE | 2711002 A1 | 9/1978 |
| EP | 1245603 | 10/2002 |
| EP | 1245683 A1 * | 10/2002 |
| WO | WO 0075243 a * | 12/2000 |

OTHER PUBLICATIONS

C. Sullivan, et al., (Reichhold) in "Zero VOC Alkyd Latex Surpassing VOC Requirements for ARchitectural Applications" presented at the American Coatings Show. 2008.
D. St. Laurent, et al. (Cytec), in "New Resins for Low VOC WB Coatings" presented at the American Coatings Show. 2008.

* cited by examiner

*Primary Examiner* — Kelechi Egwim

(57) ABSTRACT

The instant invention provides a high-solid, solvent-free alkyd dispersion, and a continuous process for producing the same. The aqueous alkyd dispersion, according to the present invention comprises (a) from 40 to 70 percent by weight of one or more alkyds based on the total weight of the dispersion, wherein each one or more alkyds has an acid value of less than 20 and a molecular weight (Mn) in the range of greater than 1000 Dalton; (b) from less than 10 percent by weight of one or more surfactants, based on the total weight of the dispersion; and (c) from 30 to 55 percent by weight of water, based on the total weight of the dispersion; and the dispersion has an average particle size diameter in the range of 0.05 to 5 μm.

14 Claims, No Drawings

ALKYD DISPERSION, AND A PROCESS FOR PRODUCING THE SAME

CROSS-REFERENCE TO RELATED APPLICATIONS

This application is a non-provisional application claiming priority from the U.S. Provisional Patent Application No. 61/256,389, filed on Oct. 30, 2009, entitled "ALKYD DISPERION, AND A PROCESS FOR PRODUCING THE SAME," the teachings of which are incorporated by reference herein, as if reproduced in full hereinbelow.

FIELD OF INVENTION

The present invention relates to an aqueous, high-solid, solvent-free alkyd dispersion, and a process for producing the same.

BACKGROUND OF THE INVENTION

Alkyds are a major part of the architectural coatings market. A significant portion of the market is still based on solvent-borne coatings. Waterborne coatings are becoming more important as a solution to the more stringent volatile organic compounds ("VOC") regulations. Currently, water-based alkyds are in the form of either emulsions or water-reducibles (in water miscible solvent). The current water-based alkyds are prepared using low molecular weight resins with either high acid values, for example greater than 50 for neutralization with amines to improve water dispersibility by salt formation, or high levels of emulsifying agents or stabilizers or special functionalization, for example, chemical modification with monomers such as polyglycols or sulfonate-containing compounds.

However, there is still a need for an alkyd dispersion having high solid content, ultra-low volatile organic compounds with coating properties and performances comparable to those of solvent grade alkyds without the need for the functionalization of the resin. Accordingly, the present invention provides an alkyd dispersion having high solid content, ultra-low volatile organic compounds with coating properties and performances comparable to those of solvent grade alkyds without the need for a functionalization of the resin.

SUMMARY OF THE INVENTION

The present invention provides an aqueous, high-solid, solvent-free alkyd dispersion, and a process for producing the same.

In one embodiment, the present invention provides an aqueous, high-solid, solvent-free alkyd dispersion comprising (a) from 40 to 70 percent by weight of one or more alkyds based on the total weight of the dispersion, wherein each one or more alkyds has an acid value of less than 20 and a molecular weight ($M_n$) in the range of greater than 1000 Dalton; (b) from less than 10 percent by weight of one or more stabilizing agents, based on the total weight of the dispersion; and (c) from 30 to 55 percent by weight of water, based on the total weight of the dispersion; and wherein the dispersion has an average particle size diameter in the range of 0.05 to 5 μm.

In an alternative embodiment, the present invention further provides a continuous process for producing an aqueous, high-solid, solvent-free alkyd dispersion comprising the steps of: (1) providing one or more molten or liquid alkyds, wherein each said one or more molten or liquid alkyds has an acid value of less than 20 and a molecular weight ($M_n$) in the range of greater than 1000 Dalton; (2) providing one or more stabilizing agents; (3) providing water; (4) optionally providing one or more neutralizing agents; (5) continuously emulsifying said one or more molten or liquid alkyds in the water in the presence of said one or more stabilizing agents and optionally said one or more neutralizing agents; (6) thereby producing a high internal phase emulsion; (7) providing additional water; (8) contacting said high internal phase emulsion with said additional water; (9) thereby producing said aqueous alkyd dispersion, wherein said alkyd dispersion comprises from 40 to 70 percent by weight of said one or more alkyds, from less than 10 percent by weight of said one or more surfactants, and wherein said dispersion has an average particle size diameter in the range of from 0.05 to 5 μm.

In an alternative embodiment, the present invention provides an aqueous alkyd dispersion, continuous process for producing the same, in accordance with any of the preceding embodiments, except that the one or more alkyds are neutralized up to 100 percent by a neutralizing agent.

In an alternative embodiment, the present invention provides an aqueous alkyd dispersion, continuous process for producing the same, in accordance with any of the preceding embodiments, except that the one or more alkyds are neutralized up to 200 percent by a neutralizing agent.

In an alternative embodiment, the present invention provides an aqueous alkyd dispersion, continuous process for producing the same, in accordance with any of the preceding embodiments, except that the dispersion has a viscosity in the range of 100 to 10,000 cP. In an alternative embodiment, the present invention provides coatings derived from the inventive aqueous alkyd dispersion, and in a further embodiment, the current invention provides a method of forming a dry coating derived from the inventive aqueous alkyd dispersion, which exhibits good scrub resistance.

In an alternative embodiment, the present invention provides coatings derived from the inventive aqueous alkyd dispersion, wherein said coating has superior scrub resistance, improved tannin stain resistance, and/or improved grain raising resistance.

In an alternative embodiment, the present invention provides an aqueous alkyd dispersion, wherein said alkyd dispersion has improved heat age stability.

DETAILED DESCRIPTION OF THE INVENTION

The instant invention provides an aqueous, high-solid, solvent-free alkyd dispersion, and a continuous process for producing the same. The aqueous, high-solid, solvent-free alkyd dispersion, according to the present invention, comprises (a) from 40 to 70 percent by weight of one or more alkyds based on the total weight of the dispersion, wherein each one or more alkyds has an acid value of less than 20 and a molecular weight ($M_n$) in the range of greater than 1000 Dalton; (b) from less than 10 percent by weight of one or more stabilizing agents, based on the total weight of the dispersion; and (c) from 30 to 55 percent by weight of water, based on the total weight of the dispersion; and wherein the dispersion has an average particle size diameter in the range of 0.05 to 5 μm.

The alkyds dispersion comprises from 40 to 70 percent by weight of one or more alkyds. All individual values and subranges from 40 to 70 weight percent are included herein and disclosed herein; for example, the weight percent can be from a lower limit of 40, 45, 50, 55, or 60 to an upper limit of 60, 65, or 70. Each one or more alkyds has an acid value in the range of 20 or less. All individual values and subranges from 20 or less acid value are included herein and disclosed herein; for example, the acid value can be from a lower limit of one, 0.1, 0.5, 1, 2, 5, 70 or 10 to an upper limit of 5, 7, 10, 15, or 20. Each one or more alkyds has a molecular weight ($M_n$) in the range of equal to or greater than 1000 Dalton; for example, equal to or greater than 2000 Dalton, or in the alternative, equal to or greater than 4000 Dalton.

The alkyd resins suitable for the present invention have a viscosity in the range of from 100 to 1,500,000 Centipoise (mPa·s) at 80° C. and shear rate of 0.10/sec. All individual values and subranges from 100 to 1,500,000 Centipoise (mPa·s) at 80° C. and shear rate of 0.10/sec are included herein and disclosed herein; for example, the viscosity may be from a lower limit of 100, 1000, 5000, 15000, or 25000 Centipoise (mPa·s) at 80° C. and shear rate of 0.10/sec to an upper limit of 100,000, 250,000, 500,00, 750,000, 1,000,000, or 1,500,000 Centipoise (mPa·s) at 80° C. and shear rate of 0.10/sec.

Alkyd resins are polyesters of polyhydroxyl alcohols and polycarboxylic acids chemically combined with various drying and semi-drying oils in different proportions. Polyhydroxyl alcohols may include, but are not limited to, such components as ethylene glycol, diethylene glycol, neopentyl glycol, 1,4-butanediol, 1,6-hexanediol, glycerol, pentaerythritol, sorbitol and mannitol.

Suitable glycols thus include ethylene glycol, propylene glycol, diethylene glycol, triethylene glycol, tetraethylene glycol, pentaethylene glycol, hexaethylene glycol, heptaethylene glycol, octaethylene glycol, nonaethylene glycol, decaethylene glycol, neopentyl glycol, glycerol, 1,3-propanediol, 2,4-dimethyl-2-ethyl-hexane-1,3-diol, 2,2-dimethyl-1,2-propanediol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, 2,2,4-tetramethyl-1,6-hexanediol, thiodiethanol, 1,2-cyclohexanedimethanol, 1,3-cyclohexanedimethanol, 1,4-cyclohexanedimethanol, 2,2,4-trimethyl-1,3-pentanediol, 2,2,4-tetramethyl-1,3-cyclobutanediol, p-xylenediol, hydroxypivalyl hydroxypivalate, 1,10-decanediol, hydrogenated bisphenol A, trimethylolpropane, trimethylolethane, pentaerythritol, erythritol, threitol, dipentaerythritol, sorbitol, mannitol, glycerine, trimellitic anhydride, pyromellitic dianhydride, dimethylolpropionic acid, and the like.

Polycarboxylic acids may include, but are not limited to, phthalic acid, maleic acid, fumaric acid, isophthalic acid, succinic acid, adipic acid, azeleic acid, and sebacic acid, terephthalic acid, tetrachlorophthalic anhydride, tetrahydrophthalic anhydride, dodecanedioic acid, sebacic acid, azelaic acid, 1,4-cyclohexanedicarboxylic acid, 1,3-cyclohexanedicarboxylic acid, 2,6-naphthalenedicarboxylic acid, glutaric acid, trimellitic anhydride acid, benzoic acid, citric acid, pyromellitic dianhydride acid, trimesic acid, sodium sulfoisophthalic acid, as well as from anhydrides of such acids, and esters thereof, where they exist.

Drying oils may include, but are not limited to, coconut oil, fish oil, linseed oil, tung oil, castor oil, cottonseed oil, safflower oil, sunflower oil, soybean oil, and tall oil.

In addition to an amount of polyol reacted with a fatty acid, fatty ester, or naturally occurring-partially saponified oil, an additional amount of a polyol or other branching agent such as a polycarboxylic acid may be used to increase the molecular weight and branching of the alkyd resin, and may be selected from trimethylolethane, pentaerythritol, erythritol, threitol, dipentaerythritol, sorbitol, glycerine, trimellitic anhydride, pyromellitic dianhydride, dimethylolpropionic acid, and trimethylolpropane.

Alkyds may be produced, for example, by direct fusion of glycerol, phthalic anhydride and drying oil. Solvents may be added to reduce the viscosity. Various proportions of the polycarboxylic acid, polyhydric alcohol, and oil are used to obtain alkyd resins of various properties, as is well known in the art.

Alkyds may further include any one or more modifications, for example, alkyd may be urethane modified, acrylic modified, styrene modified, vinyl ester modified, vinyl ether modified, silicone modified, epoxy modified, combinations thereof, and the like.

One or more alkyds may, for example, be one or more uralkyds, i.e. urethane modified alkyd. Uralkyds may be prepared by reacting alkyds having isocyanate-reactive groups with polyisocyanates and optionally other components having isocyanate-reactive groups. Isocyanate-reactive groups are defined as groups which will react with an isocyanate group (—NCO) and examples include -OH, —NH$_2$, —NH—, and —SH. Preferred isocyanate-reactive groups are —OH. Other components include but are not limited to polyamines and polyols, for example polyols having water-dispersing groups, as described below.

Examples of suitable polyisocyanate(s), (normally diisocyanate(s)) include aliphatic and cycloaliphatic polyisocyanates such as ethylene diisocyanate, 1,6-hexamethylene diisocyanate HDI, isophorone diisocyanate (IPDI), cyclohexane-1,4-diisocyanate, 4,4'-dicyclohexylmethane diisocyanate, cyclopentylene diisocyanate, p-tetra-methylxylene diisocyanate (p-TMXDI) and its meta isomer (m-TMXDI), hydrogenated 2,4-toluene diisocyanate and hydrogenated 2,6-toluene diisocyanate. Also araliphatic and aromatic polyisocyanates may be used, such as p-xylene diisocyanate, 1,4-phenylene diisocyanate, 2,4-toluene diisocyanate, 2,6-toluene diisocyanate, 4,4'-diphenylmethane diisocyanate, 2,4'-diphenylmethane diisocyanate and 1,5-naphthylene diisocyanate. Particularly preferred is 2,4-toluene diisocyanate (TDI), optionally in admixture with its 2,6-isomer.

Examples of suitable polyols for use in preparation of uralkyds include difunctional alcohols, trifunctional alcohols (e.g., glycerine, trimethylol propane, trimethylol ethane, trimethylol butane, tris hydroxyethyl isocyanurate, etc.), tetrahydric or higher alcohols (e.g., pentaerythritol, diglycerol, etc.), and combinations thereof. Trifunctional alcohols are preferred due to the degree of branching they allow. Difunctional alcohols (or diols), if used, are preferably used in combination with trifunctional or higher alcohols. Examples of suitable diols include neopentyl glycol (NPG), ethylene glycol, propylene glycol, diethylene glycol, triethylene glycol, tetraethylene glycol, pentaethylene glycol, hexaethylene glycol, heptaethylene glycol, octaethylene glycol, nonaethylene glycol, decaethylene glycol, 1,3-propanediol, 2,4-dimethyl-2-ethyl-hexane-1,3-diol, 2,2-dimethyl-1,2-propanediol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, 2,2,4-tetramethyl-1,6-hexanediol, thiodiethanol, 1,2-cyclohexanedimethanol, 1,3-cyclohexanedimethanol, 1,4-cyclohexanedimethanol, 2,2,4-trimethyl-1,3-pentanediol, 2,2,4-tetramethyl-1,3-cyclobutanediol, p-xylenediol, hydroxypivalylhydroxypivalate, 1,10-decanediol, and hydrogenated bisphenol A.

The reaction mixture for producing alkyds includes one or more aliphatic or aromatic polycarboxylic acids, esterified polymerization products thereof, and combinations thereof. As used herein, the term "polycarboxylic acid" includes both polycarboxylic acids and anhydrides thereof. Examples of suitable polycarboxylic acids for use in the present invention include phthalic acid, isophthalic acid, terephthalic acid, tetrahydrophthalic acid, naphthalene dicarboxylic acid, and anhydrides and combinations thereof.

Mixtures of polyisocyanates can be used and also polyisocyanates which have been modified by the introduction of urethane, allophanate, urea, biuret, carbodiimide, uretonimine or isocyanurate residues.

Alkyds may include water-dispersing groups, for example, ionic groups such as anionic carboxylic acid groups, and/or non-ionic water-dispersing groups such as polyethylene oxide (PEO) chain groups.

A suitable polyol(s) having carboxylic acid groups is, for example, a low molecular weight (<500 Daltons) polyol, in particular a diol, whereby carboxylate anionic groups is provided by the carboxylic acid groups after neutralization with a suitable base. Exemplary diol includes, but are not limited to, dihydroxyalkanoic acids, and 2,2-dimethylol propionic acid (DMPA).

The one or more alkyds may be partially or fully neutralized with a neutralizing agent. In certain embodiments, neutralization of the one or more alkyds may be from 5 to 200 percent on a molar basis; or in the alternative, it may be from 25 to 100 percent on a molar basis. The neutralizing agent may be a base, such as ammonium hydroxide or potassium hydroxide, for example. Other neutralizing agents can include lithium hydroxide or sodium hydroxide, for example. In another alternative, the neutralizing agent may, for example, be a carbonate. In another alternative, the neutralizing agent may, for example, be any amine such as monoethanolamine, or 2-amino-2-methyl-1-propanol (AMP). Amines useful in embodiments disclosed herein may include monoethanolamine, diethanolamine, triethanolamine, and TRIS AMINO (each available from Angus), NEUTROL TE (available from BASF), as well as triisopropanolamine, diisopropanolamine, and N,N-dimethylethanolamine (each available from The Dow Chemical Company, Midland, Mich.). Other useful amines may include ammonia, monomethylamine, dimethylamine, trimethylamine, monoethylamine, diethylamine, triethylamine, mono-n-propylamine, dimethyl-n propylamine, N-methanol amine, N-aminoethylethanolamine, N-methyldiethanolamine, monoisopropanolamine, N,N-dimethyl propanolamine, 2-amino-2-methyl-1-propanol, tris(hydroxymethyl)-aminomethane, N,N,N'N'-tetrakis(2-hydroxylpropyl)ethylenediamine, 1.2-diaminopropane. In some embodiments, mixtures of amines or mixtures of amines with bases may be used. Those having ordinary skill in the art will appreciate that the selection of an appropriate neutralizing agent depends on the specific composition formulated, and that such a choice is within the knowledge of those of ordinary skill in the art.

The aqueous alkyd dispersion further comprises from less than 10 percent by weight of one or more stabilizing agents, based on the total weight of the dispersion. All individual values and subranges from less than 10 weight percent are included herein and disclosed herein; for example, the weight percent can be from a lower limit of 1, 2, 3, 4, 5, 6 or 7 weight percent to an upper limit of 2, 3, 4, 6, 8, 9, or 10. The stabilizing agent may, for example, be an external stabilizing agent or an internal stabilizing agent. In selected embodiments, the stabilizing agent may be a surfactant, a polymer, or mixtures thereof. In certain embodiments, the stabilizing agent can be a polar polymer, having a polar group as either a comonomer or grafted monomer. In exemplary embodiments, the stabilizing agent comprises one or more polar polyolefins, having a polar group as either a comonomer or grafted monomer. Exemplary polymeric stabilizing agents include, but are not limited to, ethylene-acrylic acid (EAA) and ethylene-methacrylic acid copolymers, such as those available under the trademarks PRIMACOR™, commercially available from The Dow Chemical Company, NUCREL™, commercially available from E.I. DuPont de Nemours, and ESCOR™, commercially available from ExxonMobil Chemical Company and described in U.S. Pat. Nos. 4,599,392, 4,988,781, and 5,938,437, each of which is incorporated herein by reference in its entirety. Other exemplary polymeric stabilizing agents include, but are not limited to, ethylene ethyl acrylate (EEA) copolymer, ethylene methyl methacrylate (EMMA), and ethylene butyl acrylate (EBA). Other ethylene-carboxylic acid copolymer may also be used. Those having ordinary skill in the art will recognize that a number of other useful polymers may also be used.

Other stabilizing agents that may be used include, but are not limited to, long chain fatty acids, fatty acid salts, or fatty acid alkyl esters having from 12 to 60 carbon atoms. In other embodiments, the long chain fatty acid or fatty acid salt may have from 12 to 40 carbon atoms.

The stabilizing agent may be partially or fully neutralized with a neutralizing agent. In certain embodiments, neutralization of the stabilizing agent, such as a long chain fatty acid or EAA, may be from 25 to 200 percent on a molar basis; or in the alternative, it may be from 50 to 110 percent on a molar basis. For example, for EAA, the neutralizing agent may be a base, such as ammonium hydroxide or potassium hydroxide, for example. Other neutralizing agents can include lithium hydroxide or sodium hydroxide, for example. In another alternative, the neutralizing agent may, for example, be a carbonate. In another alternative, the neutralizing agent may, for example, be any amine such as monoethanolamine, or 2-amino-2-methyl-1-propanol (AMP). Amines useful in embodiments disclosed herein may include monoethanolamine, diethanolamine, triethanolamine, and TRIS AMINO (each available from Angus), NEUTROL TE (available from BASF), as well as triisopropanolamine, diisopropanolamine, and N,N-dimethylethanolamine (each available from The Dow Chemical Company, Midland, Mich.). Other useful amines may include ammonia, monomethylamine, dimethylamine, trimethylamine, monoethylamine, diethylamine, triethylamine, mono-n-propylamine, dimethyl-n propylamine, N-methanol amine, N-aminoethylethanolamine, N-methyldiethanolamine, monoisopropanolamine, N,N-dimethyl propanolamine, 2-amino-2-methyl-1-propanol, tris(hydroxymethyl)-aminomethane, N,N,N'N'-tetrakis(2-hydroxylpropyl)ethylenediamine, 1.2-diaminopropane. In some embodiments, mixtures of amines or mixtures of amines and surfactants may be used. Those having ordinary skill in the art will appreciate that the selection of an appropriate neutralizing agent depends on the specific composition formulated, and that such a choice is within the knowledge of those of ordinary skill in the art.

Additional stabilizing agents that may be useful in the practice of the present invention include, but are not limited to, cationic surfactants, anionic surfactants, or non-ionic surfactants. Examples of anionic surfactants include, but are not limited to, sulfonates, carboxylates, and phosphates. Examples of cationic surfactants include, but are not limited to, quaternary amines. Examples of non-ionic surfactants include, but are not limited to, block copolymers containing ethylene oxide and silicone surfactants. Stabilizing agents useful in the practice of the present invention can be either external surfactants or internal surfactants. External surfactants are surfactants that do not become chemically reacted into the alkyd resin during dispersion preparation. Examples of external surfactants useful herein include, but are not limited to, salts of dodecyl benzene sulfonic acid and lauryl sulfonic acid salt. Internal surfactants are surfactants that do become chemically reacted into the alkyd resin during dispersion preparation. An example of an internal surfactant useful herein includes 2,2-dimethylol propionic acid and its salts. Additional surfactants that may be useful in the practice of the present invention include cationic surfactants, anionic surfactants, non-ionic surfactants, or combinations thereof. Various commercially available surfactants may be used in embodiments disclosed herein, including: OP-100 (a sodium stearate), OPK-1000 (a potassium stearate), and OPK-181 (a potassium oleate), each available from RTD Hallstar; UNICID 350, available from Baker Petrolite; DISPONIL FES 77-IS, DISPONIL FES-32-IS, DISPONIL FES-993, and DISPONIL TA-430, each available from Cognis; RHODAPEX CO-436, SOPROPHOR4D384, 3D-33, and 796/P, RHODACAL BX-78 and LDS-22, RHODAFAC RE-610, and RM-710, and SUPRAGIL MNS/90, each available from Rhodia; E-sperse 100, E-sperse 700, and E-sperse 701 from Ethox Chemical; and TRITON QS-15, TRITON W-30, DOWFAX 2A1, DOWFAX 3B2, DOWFAX 8390, DOWFAX C6L, TRITON X-200, TRITON XN-45S, TRITON H-55, TRITON GR-5M, TRITON BG-10, and TRITON CG-110, each available from The Dow Chemical Company, Midland, Mich.

The alkyd dispersion further comprises a fluid medium. The fluid medium may be any medium; for example, the fluid medium may be water. The alkyd dispersion of the present invention comprises 35 to 75 percent by weight of fluid medium, based on the total weight of the dispersion. In particular embodiments, the water content may be in the range of from 35 to 65, or in the alternative from 35 to 55, or in the alternative from 45 to 55 percent by weight, based on the total weight of the dispersion. Water content of the alkyd dispersion may preferably be controlled so that the solids content is between about 1 percent to about 90 percent by weight, based on the total weight of the dispersion. In particular embodiments, the solids range may be between about 10 percent to about 70 percent by weight. In other particular embodiments, the solids range is between about 40 percent to about 70 percent by weight. In certain other embodiments, the solids range is between about 25 percent to about 55 percent by weight.

The solid content of the alkyd dispersion has an average particle size diameter in the range of from 0.05 to 5 μm. All individual values and subranges from 0.05 to 5 μm are included herein and disclosed herein; for example, the average particle size diameter can be from a lower limit of 0.05, 0.1, 0.2, 0.5, or 1 μm to an upper limit of 1, 2, 3, 4, or 5 μm.

The alkyd dispersion according to the present invention may further be blended with one or more binder compositions such as acrylic latex, vinyl acrylic latex, styrene acrylic latex, vinyl acetate ethylene latex, and combinations thereof; optionally one or more solvents; optionally one or more cosolvents; optionally one or more fillers; optionally one or more additives; optionally one or more pigments, e.g. titanium dioxide, mica, calcium carbonate, silica, zinc oxide, milled glass, aluminum trihydrate, talc, antimony trioxide, fly ash, and clay; optionally one or more dispersants, e.g. aminoalcohols, and polycarboxylates; optionally one or more surfactants; optionally one or more defoamers; optionally one or more preservatives, e.g. biocides, mildewcides, fungicides, algaecides, and combinations thereof; optionally one or more thickeners, e.g. cellulosic based thickeners such as hydroxyethyl cellulose, hydrophobically modified alkali soluble emulsions and hydrophobically modified ethoxylated urethane thickeners (HEUR); optionally one or more biocides; optionally more defoamers; optionally one or more flow agents; optionally one or more leveling agents; or optionally one or more additional neutralizing agents, e.g. hydroxides, amines, ammonia, and carbonates.

The alkyd dispersion may further comprise a colorant as part of the alkyd dispersion. A variety of colors may be used. Examples include colors such as yellow, magenta, and cyan. As a black coloring agent, carbon black, and a coloring agent toned to black using the yellow/magenta/cyan coloring agents shown below may be used. Colorants, as used herein, include dyes, pigments, and pre-dispersions, among others. These colorants may be used singly, in a mixture, or as a solid solution. In various embodiments, pigments may be provided in the form of raw pigments, treated pigments, pre-milled pigments, pigment powders, pigment presscakes, pigment masterbatches, recycled pigment, and solid or liquid pigment pre-dispersions. As used herein, a raw pigment is a pigment particle that has had no wet treatments applied to its surface, such as to deposit various coatings on the surface. Raw pigment and treated pigment are further discussed in PCT Publication No. WO 2005/095277 and U.S. Patent Application Publication No. 20060078485, the relevant portions of which are incorporated herein by reference. In contrast, a treated pigment may have undergone wet treatment, such as to provide metal oxide coatings on the particle surfaces. Examples of metal oxide coatings include alumina, silica, and zirconia. Recycled pigment may also be used as the starting pigment particles, where recycled pigment is pigment after wet treatment of insufficient quality to be sold as coated pigment.

Exemplary colorant particles include, but are not limited to, pigments such as yellow coloring agent, compounds typified by a condensed azo compound, an isoindolynone compound, an anthraquinone compound, an azometal complex methine compound, and an allylamide compound as pigments may be used. As a magenta coloring agent, a condensed azo compound, a diketopyrrolopyrrole compound, anthraquinone, a quinacridone compound, a base dye lake compound, a naphthol compound, a benzimidazolone compound, a thioindigo compound, and a perylene compound may be used. As a cyan coloring agent, a copper phthalocyanine compound and its derivative, an anthraquinone compound, a base dye lake compound, and the like may be used.

In one embodiment, one or more alkyds, one or more stabilizing agents are melt-kneaded in an extruder along with water and a neutralizing agent, such as ammonia, potassium hydroxide, or a combination of the two to form an alkyd dispersion. In another embodiment, one or more liquid alkyds, one or more stabilizing agents are melt-kneaded in an extruder along with water and a neutralizing agent, such as ammonia, potassium hydroxide, or a combination of the two to form an alkyd dispersion. In some embodiments, the dispersion is first diluted to contain about 1 to about 20 percent by weight water and then, subsequently, further diluted to comprise greater than about 25 percent by weight water.

Any melt-kneading means known in the art may be used. In some embodiments, a kneader, a BANBURY® mixer, single-screw extruder, or a multi-screw extruder, e.g. a twin screw extruder, is used. A process for producing the dispersions in accordance with the present invention is not particularly limited. For example, an extruder, in certain embodiments, for example, a twin screw extruder, is coupled to a back pressure regulator, melt pump, or gear pump. Exemplary embodiments also provide a base reservoir and an initial water reservoir, each of which includes a pump. Desired amounts of base and initial water are provided from the base reservoir and the initial water reservoir, respectively. Any suitable pump may be used, but in some embodiments, for example, a pump that provides a flow of about 150 cc/min at a pressure of 240 bar is used to provide the base and the initial water to the extruder. In other embodiments, a liquid injection pump provides a flow of 300 cc/min at 200 bar or 600 cc/min at 133 bar. In some embodiments, the base and initial water are preheated in a preheater.

One or more alkyds, in the form of liquid, pellets, powder, or flakes, are fed from the feeder to an inlet of the extruder where the resin is melted or compounded. Optionally one or more fillers may be fed simultaneously with one or more alkyds into the extruder via the feeder; or in the alternative, one or more fillers may be compounded into one or more alkyds, and then fed into the extruder via the feeder. In the alternative, additional one or more fillers may further be metered via an inlet prior to the emulsification zone into the molten compound comprising one or more alkyds and optionally one or more fillers. In some embodiments, the stabilizing agent is added to one or more alkyds through and along with the one or more alkyds and in other embodiments, the stabilizing agent is provided separately to the twin screw extruder. The resin melt is then delivered from the mix and convey zone to an emulsification zone of the extruder where the initial amount of water and base from the water and base reservoirs are added through an inlet. In some embodiments, stabilizing agent may be added additionally or exclusively to the water stream. In some embodiments, further dilution water may be added via a water inlet from water reservoir in a dilution and cooling zone of the extruder. Typically, the dispersion is diluted to at least 30 weight percent water in the cooling zone. In addition, the diluted mixture may be diluted any number of times until the desired dilution level is achieved. In some embodiments, water is not added into the twin screw extruder but rather to a stream containing the resin melt after the melt has exited from the extruder. In this manner, steam pressure build-up in the extruder is eliminated and the dispersion is formed in a secondary mixing device such as a rotor stator mixer.

In an alternative, one or more alkyds, in the form of liquid or molten are fed into a first mixing device, such as a rotor stator mixer, and brought into contact with water, and optionally a neutralizing agent, in the presence of one or more stabilizing agents, thereby forming a high internal phase emulsion. Subsequently, the high internal phase emulsion is contacted with additional water, thereby producing the alkyd dispersion of the present invention. The one or more alkyds may be melted via, for example, a melt pump. Such melt pumps are generally known to a person of ordinary skill in the art.

The films formed from the inventive aqueous alkyd dispersions have a gloss of greater than 75 percent; for example greater than 80 percent; or, for example, greater than 85 percent. The specified gloss is measured, for example, at 60° on a nonporous substrate like a Leneta panel. The inventive aqueous alkyd dispersions are substantially free of any volatile organic compounds; for example, the inventive aqueous alkyd dispersions are free of any volatile organic compounds. Substantially free of any volatile organic compounds, such as certain solvents, refers to the inventive alkyd dispersions comprising less than 0.5 percent by weight of any volatile organic compounds, based on the total weight of the dispersion; for example, less than 0.05 weight percent, or less than 0.01 weight percent. The inventive aqueous alkyd dispersion has a viscosity in the range of from 100 to 10,000 cP; for example, from 100 to 1,000 cP. The inventive aqueous alkyd dispersion has a pH in the range of less than 12; for example, less than 11, or less than 10, or less than 9, and greater than 5, or greater than 6, or greater than 7.

The continuous process for producing the aqueous, high-solid, solvent-free alkyd dispersion, according to the present invention, comprises the steps of: (1) providing one or more molten or liquid alkyds, wherein each said one or more molten or liquid alkyds has an acid number of less than 20 and a molecular weight ($M_n$) in the range of greater than 1000 Dalton; (2) providing one or more stabilizing agents; (3) providing water; (4) optionally providing one or more neutralizing agents; (5) continuously emulsifying said one or more molten or liquid alkyds in the water in the presence of said one or more surfactants and optionally said one or more neutralizing agents; (6) thereby producing a high internal phase emulsion; (7) providing additional water; (8) contacting said high internal phase emulsion with said additional water; (9) thereby producing said aqueous alkyd dispersion, wherein said alkyd dispersion comprises from 45 to 70 percent by weight of said one or more alkyds, from less than 10 percent by weight of said one or more stabilizing agents, and wherein said dispersion has an average particle size diameter in the range of from 0.05 to 5 µm.

The alkyd dispersions of the present invention may be used, for example, in different coating applications such as industrial coating applications, architectural coating applications, automotive coating applications, outdoor furniture coating applications.

The coated articles or structures according to the present invention comprise a coating layer associated with one or more surfaces of an article or a structure, wherein said coating layer is derived from the inventive alkyd dispersion according to the present invention.

Suitable driers for use in this invention include without limitation, metal-containing compounds; for example, cobalt, zirconium, manganese, calcium, zinc, copper, barium, vanadium, cerium, iron, potassium, strontium, aluminum, bismuth and lithium-containing compounds. Examples of non-metallic drier promoters include 8-hydroxyquinoline, quinoline, salicyl aldoxime, pyridine-2-carbaldoxime, acetylacetonate enamines, 2-2'-bipyridyl, ethylenediamine, propylenediamine, pyridine, o-vinylpyridine, o-aminopyridine, aniline, o-phenylenediamine, o-toluidine, alpha-naphthylamine, o-phenanthroline, dipropylamine, diamylamine, acrylonitrile, succinonitrile, o-tolunitrile, o-toluamide, pyrrole, benzimidazole, benzotriazole, benzophenone, benzophenone methacrylate, and the like. Driers and drier promoters can be present in the range of 0.0002 weight percent to 1.0 weight percent, based on the total weight of the alkyd, for example, from 0.0002 weight percent to 0.5 weight percent, based on the weight of the alkyd; or in the alternative, from 0.0005 weight percent to 0.5 weight percent. Oxi-Coat (OMG Fe based drier) as well as combination of Co Hydro-Cure II, Dri-RX HF, and Zr Hydro-CEM can be used to yield a coating improved performance profile.

The alkyd dispersions according to the present invention are film forming compositions. The films derived from the inventive alkyd dispersions may have any thickness; for example, such films may have a thickness in the range of from 0.01 µm to 1 mm; or in the alternative, from 1 µm to 500 µm; or in the alternative, from 1 µm to 100 µm; or in the alternative, from 1 to 50 µm; or in the alternative, from 1 µm to 25 µm; or in the alternative, from 1 to 10 µm.

The method for coating articles or structures according to the present invention comprises the steps of (1) selecting the inventive alkyd dispersion (2) applying the alkyd dispersion to one or more surfaces of an article or a structure; (3) removing a portion of water from the alkyd dispersion associated with one or more surfaces of the article or structure; and (4) thereby coating the article or structure.

The present invention comprises a pigmented coating derived from the inventive water-based alkyd dispersion with scrub resistance above 300, preferably above 400, more preferably above 500 scrub cycles. There is further provided a method for producing a pigmented coating with good scrub resistance comprising the steps of (1) selecting the inventive alkyd dispersion, (2) formulating the inventive dispersion into a pigmented paint, (3) applying the formulated paint to one or more surfaces or structures, (4) removing a portion of water from the formulated alkyd dispersion associated with one or more surfaces of the article or structure and (5) thereby coating the article or structure; wherein pigmented coating has scrub resistance above 300, preferably above 400, more preferably above 500 scrub cycles.

The alkyd dispersion may be applied to one or more surfaces of an article or a structure via any method. Such method include, but are not limited to, spraying, dipping, rolling, brushing, and any other conventional technique generally known to those skilled in the art. The inventive alkyd dispersion may be applied to one or more surfaces of an article or structure at a temperature in the range of greater than about 5° C. Such structures include, but are not limited to, commercial building, residential buildings, and warehouses. The inventive alkyd dispersions may be used as coatings for interior applications, exterior applications, or combinations thereof. The surface of such structures to be coated with the inventive alkyd dispersion may comprise concrete, wood, metal, plastic, glass, drywall, or the like.

EXAMPLES

The following examples illustrate the present invention but are not intended to limit the scope of the invention.

Inventive Example 1

Alkyd resin (solvent-free version of Deltech 300-70M, acid value 5.4 mg of KOH per g of resin, $M_n$ 3650) was heated to 50° C. (approximately for 3 to 4 hours to form a molten state) and fed into a rotor-stator mixer at 47 g/min, and at the same time, 25 percent (weight/weight) KOH solution was fed at 1.0 g/min and blended with additional water pumped at a rate of 15 g/min and injected into the mixer to create the high internal phase emulsion. The mixer speed was set at approximately 780 rpm. The average particle size diameter of the solid content of the emulsion was approximately 1.6 microns. The high internal phase emulsion had a solids content of 75 percent based on the total weight of the dispersion. The viscosity of this high internal phase emulsion was <100,000 cP. The high internal phase emulsion could be diluted by adding water at 25 parts per 100 parts of initial high internal phase emulsion; thereby forming an inventive alkyd dispersion, having a solid content of approximately 60 weight percent and a viscosity of less than 1000 cP (measured by Brookfield viscometer, spindle #2, 20 rpm, 21° C.).

Inventive Example 2

Alkyd resin (solvent-free version of Deltech 300-70M, acid value 5.4 mg KOH/g, Mn 3650) was heated to 50° C. (approximately for 3 to 4 hours to form a molten state) and fed into a rotor-stator mixer at 47 g/min. 25 percent (weight/weight) AMP solution was fed at 1.6 g/min and blended with additional water pumped at a rate of 10 g/min and additional surfactant Triton CF-10 pumped at a rate of 2.0 g/min and injected into the mixer to create the emulsion. The mixer speed was set at approximately 780 rpm. The average particle size diameter of the solid content of the emulsion was 0.96 microns. The high internal phase emulsion had a solid content of 81 percent. The viscosity of this high internal phase emulsion was <100,000 cP. The high internal phase emulsion could be diluted by adding water at 35 parts per 100 parts of initial high internal phase emulsion; thereby forming an inventive alkyd dispersion, having a solid content of approximately 60 weight percent and a viscosity of less than 1000 cP (measured by Brookfield viscometer, spindle #2, 20 rpm, 21° C.).

Inventive Example 3

Alkyd resin (solvent-free version of Deltech 300-70M, acid value 9.0 mg KOH/g, Mn 3650) was heated to 50° C. (approximately for 3 to 4 hours to form a molten state) and fed at 15 g/min and blended with oleic acid fed at 0.9 g/min and injected into a rotor-stator mixer. 25 percent (weight/weight) AMP solution was fed at 2.0 g/min and blended with additional water pumped at a rate of 3 g/min and injected into the mixer to create the high internal phase emulsion. The mixer speed was set at approximately 1300 rpm. The average particle size diameter of the solid content of the emulsion was 0.32 microns. The high internal phase emulsion had a solid content of 76 percent. The viscosity of this high internal phase emulsion was <100,000 cP. The high internal phase emulsion could be diluted by adding water at 27 parts per 100 parts of initial high internal phase emulsion; thereby forming an inventive alkyd dispersion, having a solid content of approximately 60 weight percent and a viscosity of less than 1000 cP (measured by Brookfield viscometer, spindle #2, rpm, 21° C.).

Inventive Example 4

Alkyd resin (solvent-free version of Deltech 300-70M, acid value 9.0 mg KOH/g, Mn 3650) was heated to 50° C. (approximately for 3 to 4 hours to form a molten state) and fed into a rotor-stator mixer at 15 g/min. 25 percent (weight/weight) DMEA solution was fed at 0.8 g/min and blended with additional water pumped at a rate of 3.0 g/min and additional surfactant Tergitol 15-s-30 (70 percent active in water) pumped at a rate of 1.7 g/min and injected into the mixer to create the emulsion. The mixer speed was set at approximately 1300 rpm. The average particle size diameter of the solid content of the emulsion was 0.33 microns. The high internal phase emulsion had a solid content of 73 percent. The viscosity of this high internal phase emulsion was <100,000 cP. The high internal phase emulsion could be diluted by adding water at 22 parts per 100 parts of initial high internal phase emulsion; thereby forming an inventive alkyd dispersion, having a solid content of approximately 60 weight percent and a viscosity of less than 1000 cP (measured by Brookfield viscometer, spindle #2, 20 rpm, 21° C.).

Inventive Example 5

Alkyd resin (solvent-free version of Deltech 300-70M, acid value 9.0 mg KOH/g, Mn 3650) was heated to 50° C. (approximately for 3 to 4 hours to form a molten state) and fed into a rotor-stator mixer at 15 g/min. 28 percent (weight/weight) ammonium hydroxide solution was fed at 0.15 g/min and blended with additional water pumped at a rate of 2.0 g/min and additional surfactant Rhodapex CO-436 (58 percent active) pumped at a rate of 0.5 g/min and injected into the mixer to create the emulsion. The mixer speed was set at approximately 1300 rpm. The average particle size diameter of the solid content of the emulsion was 0.44 microns. The high internal phase emulsion had a solids content of 85 percent. The viscosity of this high internal phase emulsion was <100,000 cP. The high internal phase emulsion was diluted by adding water at 40 parts per 100 parts of initial high internal phase emulsion; thereby forming an inventive alkyd dispersion, having a solid content of approximately 59 weight percent and a viscosity of approximately 180 cP (measured by Brookfield viscometer, spindle #2, 20 rpm, 21° C.).

Inventive Example 6

Long oil alkyd resin (solvent-free version of Deltech 300-70M, acid value 9.0 mg KOH/g, $M_n$ 3650) was heated to 50° C. (approximately for 3 to 4 hours to form a molten state) and fed into a rotor-stator mixer at 15 g/min. 28 percent (weight/weight) ammonium hydroxide solution was fed at 0.15 g/min and blended with additional water pumped at a rate of 3.5 g/min and additional surfactant Rhodapex CO-436 (58 percent active) pumped at a rate of 1.55 mL/min and injected into the mixer to create the high internal phase emulsion. The mixer speed was set at approximately 1300 rpm. The average particle size diameter of the solid content of the emulsion was 0.14 microns. The high internal phase emulsion had a solids content of 80 weight percent. The viscosity of this high internal phase emulsion was <100,000 cP. The high internal phase emulsion was later diluted by adding water at 14 parts per 100 parts of initial high internal phase emulsion; thereby forming the inventive alkyd dispersion, having a solid content of 70 weight percent, a viscosity of approximately 47000 cP (measured by Brookfield viscometer, spindle #7, 20 rpm, 21° C.). The inventive dispersion was further diluted by adding water at 40 parts per 100 parts of the 70 weight percent of solid content. The diluted inventive dispersion had a solid content of 48 weight percent, and a viscosity of approximately 90 cP (measured by Brookfield viscometer, spindle #1, 20 rpm, 21° C.). The inventive dispersion had a heat age stability of at least 12 weeks, with a final particle size of 0.19 microns, and no change in solid content.

Inventive Example 7

Medium oil alkyd resin (solvent-free version of Deltech 440-50M, acid value 9.0 mg KOH/g,) was heated to 80° C. (approximately for 3 to 4 hours to form a molten state), and fed into a rotor-stator mixer at 15 g/min. 28 percent (weight/weight) ammonium hydroxide solution was fed at 0.15 g/min and blended with additional water pumped at a rate of 2.9 g/min and additional surfactant Rhodapex CO-436 (58 percent active) pumped at a rate of 1.55 mL/min and injected into the mixer to create the high internal phase emulsion. The mixer speed was set at approximately 1300 rpm. The average particle size diameter of the solid content of the emulsion was 0.18 microns. The high internal phase emulsion had a solids content of 81 weight percent. The viscosity of this high internal phase emulsion was <100,000 cP. The high internal phase emulsion was later diluted by adding water at 12 g/min to the initial high internal phase emulsion; thereby forming the inventive alkyd dispersion, having a solid content of 50 weight percent, a viscosity of approximately 200 cP (measured by Brookfield viscometer, spindle #7, 20 rpm, 21° C.). The inventive dispersion had a heat age stability of at least 12 weeks, with a final particle size of 0.18 microns, and no change in solid content.

Inventive Example 8

The alkyd resin (solvent-free version of Deltech 300-70M, acid value 9.0 mg KOH/g, Mn 3650) was dispersed in the rotor stator mixer with AMP-95 to neutralize 95 percent of the acid groups and the resulting dispersion had a pH of 8.9, a average particle size diameter of 2.5 microns, polydispersity of 0.78 and solids content of 62 percent.

A standard drier package comprising 0.5 weight percent Cobalt Hydrocure, 0.1 weight percent DryRX HF and 1.1 weight percent Zirconium Hydro was added to the dispersion and a series of mixtures was made with (a) no surfactant or solvent, (b) 1 weight percent surfactant (Tergitol 15-S-3), (c) 1.5 weight percent solvent (butyl carbitol). The series of experiments were repeated by adjusting the pH of the dispersion to approximately 9 with AMP-95 prior to addition of the drier, surfactant or solvent.

The dispersions were drawn down to films on Leneta paper and the basic film properties were determined as shown in Table I. The results indicate the dispersions of the invention produce good films even with a non-optimized formulation.

TABLE I

| Property | No pH adjustment | | | pH adjustment to ~9 with AMP 95 | | |
|---|---|---|---|---|---|---|
| | Drier | Drier + surfactant | Drier + solvent | Drier | Drier + surfactant | Drier + solvent |
| Viscosity, cP (Brookfield) ASTM D2196 | 360 | 420 | 320 | 340 | 375 | 400 |
| Film quality | Smooth | Smooth | Smooth | Smooth | Smooth | Smooth |
| Film color | Yellow | Yellow | Yellow | Yellow | Yellow | Yellow |
| 20° gloss | 41.1 | 44.3 | 56.7 | 50.5 | 53.4 | 42.9 |
| 60° gloss | 78.3 | 82.9 | 83 | 76.9 | 81.9 | 77.1 |

Inventive Example 9

The alkyd resin (solvent-free version of Deltech 300-70M, acid value 9.0 mg KOH/g, Mn 3650) was dispersed in a rotor stator mixer with ammonia to neutralize 95 percent of the acid groups and at three surfactant levels (0 percent, 2 percent, 6 percent) using a sulfated alkyl phenol ethoxylate surfactant (Rhodapex CO-436). The resulting high internal phase emulsions had solids content of 70 percent with and average particle size diameter of 4 microns, 0.45 microns and 0.16 microns, respectively. Another high internal phase emulsion run was conducted at 70 percent solid content using ammonia to neutralize 95 percent of the acid groups and using a reactive surfactant (ammonium oleate) at 6 percent resulting in an average particle size diameter of 0.36 microns.

The four high-solids water dispersed alkyd were diluted with water or acetone, to a solids level of 40 weight percent and a standard drier package comprising 0.5 weight percent Cobalt Hydrocure, 0.1 weight percent DryRX HF and 1.1 weight percent Zirconium Hydro was added to the dispersion and mixed well. The tannin block resistance of the coatings was determined the results were compared with commercial WB alkyd dispersions formulated with the manufacturer's starting point formulations and commercially formulated WB alkyd paints and SB alkyd paints. The results of the tannin stain blocking test for the dispersions of the present invention are reported in Table II. The results for the comparative WB & SB alkyds are reported in Tables III, IV & V.

TABLE II

Tannin stain resistance of inventive examples

| Property | Units | No Surfactant + Ammonia | 2% CO436 + Ammonia | 6% CO436 + Ammonia | 6% Ammonium Oleate + Ammonia |
|---|---|---|---|---|---|
| Tannin stain blocking (primer & topcoat) - acetone thinned | Y value, no stain | 91.63% | 91.21% | 92.11% | 92.72% |
|  | Y value, stain | 90.87% | 88.16% | 87.12% | 85.59% |
|  | % recovery tannin | 99.17% | 96.66% | 94.58% | 92.31% |
| Tannin stain blocking (primer & topcoat) - water thinned | Y value, no stain | 91.70% | 91.34% | 91.56% | 91.65% |
|  | Y value, stain | 85.46% | 85.29% | 83.44% | 85.50% |
|  | % recovery tannin | 93.20% | 93.38% | 91.13% | 93.29% |

Comparing the results of the acetone diluted (water content: 27 weight percent) and water diluted (water content: 60 weight percent) dispersions at the same solids content of 40 weight percent, it was shown that reducing the water of the system helps improve the tannin stain resistance. SB alkyds are widely used as high hiding stain blocking primers for interior and exterior use that can be top-coated with any latex or alkyd based architectural paint. Good stain blocking is an essential functionality for the primer application and alkyds offer superior performance vs. acrylic emulsion technologies for blockig the bleedthrough of wood tannins and sap. Good wood stain blocking is a critical requirement and WB alkyds could be potential replacements for architectural and industrial maintenance (AIM) coatings if their tannin stain blocking performance is greater than 93 percent, preferably greater 95 percent or still more preferably greater than 98 percent.

TABLE III

Tannin stain resistance of commercial unformulated WB alkyd dispersions

| | Neat alkyd waterborne dispersions | | |
|---|---|---|---|
| Property of dry film | Resydrol AY 588W/42WA | Resydrol AY 6150W/45WA | Beckosol AQ 100 |
| solids, wt % of neat dispersion | 44% | 45% | 55% |
| Y value - No Stain | 93.15% | 92.90% | 93.27% |
| Y value - Stain | 80.51% | 82.26% | 84.89% |
| % Recovery Tannin | 86.43% | 88.55% | 91.02% |

TABLE IV

Tannin stain resistance of commercial formulated WB alkyd dispersions

| | Formulated alkyd waterborne dispersions | | | |
|---|---|---|---|---|
| Property of dry film | Dulux Advanced Oil 1508 Gloss | Dulux Advanced Oil 1506 S/G | Sherwin Williams Industrial Enamel Gloss | Vista Aqua Fusion Gloss |
| Y value - No Stain | 93.30% | 93.13% | 93.21% | 93.25% |
| Y value - Stain | 80.18% | 83.77% | 85.29% | 80.50% |
| % Recovery Tannin | 85.94% | 89.95% | 91.50% | 86.33% |

TABLE V

Tannin stainresistance of commercial formulated SB alkyds

| | Formulated solvent borne alkyds | | |
|---|---|---|---|
| Property of dry film | Duron Everlast Alkyd/Oil Enamel | Duron Exterior Alkyd/Oil Gloss | Benjamin Moore Gloss Enamel C1331B |
| Y value - No Stain | 92.60% | 92.93% | 93.10% |
| Y value - Stain | 92.69% | 92.77% | 92.60% |
| % Recovery Tannin | 100.10% | 99.83% | 99.46% |

The above results show that high solids WB alkyd dispersions of the present invention made by the rotor stator process with low acid value, solvent free alkyd resins and low surfactant and amine contents produce coatings with unexpectedly enhanced properties, such as improved tannin stain block resistance. Such WB alkyds could potentially address an unmet market need for low VOC replacements for SB alkyds in AIM coating applications with good tannin stain blocking resistance.

Inventive Example 10

The alkyd high internal phase emulsion from Inventive Example 8 at 70 weight percent solid content using ammonia to neutralize 95 percent of the acid groups and using a reactive surfactant (ammonium oleate) at 6 weight percent resulting in an average particle size diameter of 0.36 microns was diluted with water or acetone, to a solids level of 40 weight percent and a standard drier package comprising 0.5 weight percent Cobalt Hydrocure, 0.1 weight percent DryRX HF and 1.1 weight percent Zirconium Hydro was added to the dispersion and mixed well. The grain raise of the coatings was determined and reported in Table VI.

TABLE VI

| Property | Units | 6% Ammonium Oleate + Ammonia - acetone thinned | 6% Ammonium Oleate + Ammonia - water thinned |
|---|---|---|---|
| Grain raising (SYP: Southern Yellow Pine) | 1-5, 5 = best | 3 | 2 |
| | 60° gloss earlywood | 4.2 | 4.2 |
| | 60° gloss latewood | 17.8 | 8.4 |

Comparing the results of the acetone diluted (water content: 27 weight percent) and water thinned (water content: 60 weight percent) dispersions at the same solid content of 40 weight percent, it was shown that reducing the water of the system helps reduce the grain raising of the wood substrate. With waterborne coatings, grain raising is a problem due to absorption of water into the fibers that causes the loose stringy fibers at the surface to arise and stand clear of surrounding wood grain. The problem is mitigated with water based finishes by pre-wetting the wood grains and sanding off the fuzz after it dries with a fine grit sander. Less grain raising is desirable as it results in a reduced need for fine grit sanding between coats and reduces the application cost and the time to return the coated part to service.

The above results show that high solids WB alkyd dispersions of the present invention made by the rotor stator process with low acid value, alkyd resins and low surfactant and amine contents produce coatings with unexpectedly enhanced properties, such as reduced grain raise. Such WB alkyds could potentially address an unmet market need for low VOC WB replacements for SB alkyds in AIM coating applications with reduced application costs.

Inventive Examples 11 and 12

Synthesis of Alkyd Resins by
Alcoholysis-Esterification of Oils

First Stage

The synthesis protocol used in the preparation of alkyd resins was a two-stage alcoholysis-polyesterification method. In the first stage typical large scale alcoholysis was carried out with the product being divided up into four aliquots for the next step. To a 5 L three-neck RB flask was added sunflower oil. A glass stir rod and paddle were placed in the middle joint of the flask. The flask was attached to a lattice with overhead stirring, and an oil bath at room temperature was raised to submerge the flask. The setpoint on the bath was 220° C. and heating and stirring were started. To the stirred sunflower oil, trimethylolpropane (TMP), pentaerythritol (PE) and dibutyltin oxide (DBTO) (1200 ppm on charge) were added. Once all reactants were added a packed condenser with a set point of 95° C. was attached to one of the side joints and topped with a hosebarb adaptor that was connected to a bubbler. To the other side neck, a hosebarb adaptor was attached and connected to a nitrogen inlet. A slow nitrogen sweep was placed on the system and observed in the bubbler. The reaction mixture was allowed to heat and mix for 16 hours, typically overnight to ensure monoglyceride formation, verified by solubility in 4 parts methanol. The next day, the flask was removed from the oil bath and 900 g aliquots were transferred to individual 2 L three-neck RB flasks. The flasks were allowed to cool under a pad of $N_2$ until ready to use.

TABLE VII

| Inventive Example | | Ingredient | | | | |
|---|---|---|---|---|---|---|
| | | TMP | PE | Oil | isophthalic | phthalic |
| 11 | Base 3 LO-64 | 5.977 | 8.966 | 61.754 | 9.321 | 13.982 |
| 12 | Base 7 MO-56 | 7.813 | 11.720 | 53.645 | 10.729 | 16.093 |

Second Stage

The 2 L roundbottom flask (RBF) containing the alcoholysis mixture was equipped with a glass stir shaft and paddle. The flask was attached to lattice with overhead stirring. An oil bath at room temperature was raised to submerge the flask. The set point on the bath was 220° C. and heating and stirring were started. To the flask, purified isophthalic acid (PIA), phthalic anhydride (PAN) and xylenes (2% on total charge) were added. Then, a Dean-Stark trap was connected to one of the side joints and topped with a Friedrichs condenser connected to a bubbler. To the other side joint, a hosebarb adapter was attached that was connected to the nitrogen inlet. A nitrogen sweep was placed on the system. The system was allowed to heat (~220° C.) and the water formed was distilled out as an azeotrope with xylenes. After 3 hours, 1~2 g of the reaction mixture was collected and titrated to determine the acid value (AV). The reaction was allowed to progress until the desired AV was reached, in this case AV 8-10, then the reaction contents were poured into a glass jar and allowed to cool to room temperature under a pad of nitrogen. The viscosities for inventive examples 11 and 12 were 1107 and 26600 Centipoise (mPa·s) at 80° C. and shear rate of 0.10/sec, respectively.

Inventive Example 13

Alkyd resin from Inventive Example 12 was heated to 60° C. (approximately for 3 to 4 hours to form a molten state) and fed into a rotor-stator mixer at 15 g/min. 28 percent (weight/weight) ammonium hydroxide solution was fed at 0.077 g/min and blended with additional water pumped at a rate of 2.0 g/min while additional surfactant E-sperse 100 (60 percent active) was pumped at a rate of 1.0 mL/min and injected into the mixer to create the high internal phase emulsion. The mixer speed was set at approximately 1300 rpm. The average particle size diameter of the solid content of the emulsion was 0.18 microns. The high internal phase emulsion had a solids content of 86 weight percent. The high internal phase emulsion was later diluted by adding water at 11 g/min to the initial high internal phase emulsion; thereby forming the inventive alkyd dispersion 13, having a solid content of 52 weight percent, a viscosity of approximately 700 cP (measured by Brookfield viscometer, spindle #7, 20 rpm, 21° C.). The inventive dispersion had a heat age stability of at least 12 weeks, with a final particle size of 0.19 microns, and no change in solid content Inventive Example 14

Inventive alkyd dispersion 13 was formulated into a coating composition A. The formulation components are reported in Table VIII. Components 1-4 are premixed in container to form premix 1. Components 5-9 are premixed in a grind pot to form premix 2. Premix 1 is added to premix 2 in the grind pot; thereby forming premix 3. Premix 3 is mixed via a high speed disperser, and component 10 is gradually added to premix 3 while mixing for approximately 25 minutes at 2500 rpm; thereby forming premix 4. Components 11-13 are premixed to form premix 5 via a bench-top mixer. Premix 4 is added to premix 5 while mixing at approximately 900 rpm to form premix 6. Components 14-17 are premixed to form premix 7 via physical shaking in a closed container. Premix 7 is added to premix 6 while mixing continues at approximately 900 rpm to form final coating composition A. Viscosity of final coating composition A is adjusted to an imperial chemical industry (ICI) of approximately 2 and krebs unit (KU) of approximately 95 to 100 via gradual addition of components 18-20. The scrub resistance of final coating composition B was measured, and the results are reported in Table VIII.

TABLE VIII

| Component | Material Name | Pounds |
|---|---|---|
| 1 | Water | 41.78 |
| 2 | Natrosol Plus 330 | 0.38 |
| 3 | Bentone EW | 0.42 |
| 4 | AMP-95 | 0.32 |
| 5 | Disperbyk 190 | 1.26 |
| 6 | Triton CF-10 | 0.38 |
| 7 | Water | 15.31 |
| 8 | Rhodoline 643 | 0.26 |
| 9 | Acrysol EM-8W | 1.51 |
| 10 | Ti-Pure R-706 | 141.29 |
| 11 | AF29-R1 | 273.20 |
| 12 | Water | 24.17 |

TABLE VIII-continued

| Component | Material Name | Pounds |
|---|---|---|
| 13 | BYK-011 | 0.50 |
| 14 | Cobalt Hydro-Cure II w VOC | 1.50 |
| 15 | Dri-RX HF w VOC | 0.38 |
| 16 | Zirconium Hydro CEM w VOC | 3.14 |
| 17 | Propylene Glycol | 3.92 |
| 18 | Water | 7.00 |
| 19 | Acrysol RM-8W | 0.00 |
| 20 | Acrysol RM-2020 NPR | 19.00 |

Inventive Example 15

Alkyd resin base 7 was heated to 60° C. (approximately for 3 to 4 hours to form a molten state) and fed into a rotor-stator mixer at 15 g/min. 28 percent (weight/weight) ammonium hydroxide solution was fed at 0.077 g/min and blended with additional water pumped at a rate of 2.0 g/min and additional surfactant E-sperse 100 (60 percent active) pumped at a rate of 0.5 mL/min and injected into the mixer to create the high internal phase emulsion. The mixer speed was set at approximately 1300 rpm. The average particle size diameter of the solid content of the emulsion was 0.46 microns. The high internal phase emulsion had a solids content of 87 weight percent. The high internal phase emulsion was later diluted by adding water at 11 g/min to the initial high internal phase emulsion; thereby forming the inventive alkyd dispersion, having a solid content of 53 weight percent, a viscosity of approximately 300 cP (measured by Brookfield viscometer, spindle #7, 20 rpm, 21° C.). The inventive dispersion had a heat age stability of at least 12 weeks, with a final particle size of 0.46 microns, and no change in solid content.

Inventive Example 16

Alkyd resin base 3 was heated to 35° C. (approximately for 3 to 4 hours to form a molten state) and fed into a rotor-stator mixer at 15 g/min. 28 percent (weight/weight) ammonium hydroxide solution was fed at 0.11 g/min and blended with additional water pumped at a rate of 2.0 g/min and additional surfactant E-sperse 100 (60 percent active) pumped at a rate of 1.0 mL/min and injected into the mixer to create the high internal phase emulsion. The mixer speed was set at approximately 1300 rpm. The average particle size diameter of the solid content of the emulsion was 0.43 microns. The high internal phase emulsion had a solids content of 86 weight percent. The high internal phase emulsion was later diluted by adding water at 11 g/min to the initial high internal phase emulsion; thereby forming the inventive alkyd dispersion, having a solid content of 52 weight percent, a viscosity of approximately 850 cP (measured by Brookfield viscometer, spindle #7, 20 rpm, 21° C.).

Inventive Example 17

Inventive alkyd dispersion 16 was formulated into a coating composition B. The formulation components are reported in Table IX. Components 1-4 are premixed in container to form premix 1. Components 5-9 are premixed in a grind pot to form premix 2. Premix 1 is added to premix 2 in the grind pot; thereby forming premix 3. Premix 3 is mixed via a high speed disperser, and component 10 is gradually added to premix 3 while mixing for approximately 25 minutes at 2500 rpm; thereby forming premix 4. Components 11-13 are premixed to form premix 5 via a bench-top mixer. Premix 4 is added to premix 5 while mixing at approximately 900 rpm to form premix 6. Components 14-17 are premixed to form premix 7 via physical shaking in a closed container. Premix 7 is added to premix 6 while mixing continues at approximately 900 rpm to form final coating composition A. Viscosity of final coating composition A is adjusted to an imperial chemical industry (ICI) of approximately 2 and krebs unit (KU) of approximately 95 to 100 via gradual addition of components 18-20. The scrub resistance of final coating composition B was measured, and the results are reported in Table IX.

TABLE IX

| Component | Material Name | Pounds |
|---|---|---|
| 1 | Water | 41.78 |
| 2 | Natrosol Plus 330 | 0.38 |
| 3 | Bentone EW | 0.42 |
| 4 | AMP-95 | 0.32 |
| 5 | Disperbyk 190 | 1.26 |
| 6 | Triton CF-10 | 0.38 |
| 7 | Water | 15.31 |
| 8 | Rhodoline 643 | 0.26 |
| 9 | Acrysol EM-8W | 1.51 |
| 10 | Ti-Pure R-706 | 141.29 |
| 11 | AG01-R1 | 264.05 |
| 12 | Water | 28.78 |
| 13 | BYK-011 | 0.50 |
| 14 | Cobalt Hydro-Cure II w VOC | 1.50 |
| 15 | Dri-RX HF w VOC | 0.38 |
| 16 | Zirconium Hydro CEM w VOC | 3.14 |
| 17 | Propylene Glycol | 3.92 |
| 18 | Water | 3.12 |
| 19 | Acrysol RM-8W | 0.00 |
| 20 | Acrysol RM-2020 NPR | 22.88 |

Table X shows that high solids, WB alkyd dispersions of the present invention made by the rotor stator process with low acid value, solvent-free alkyd resins and low surfactant and amine contents produce coatings with unexpectedly enhanced scrub resistance.

TABLE X

| | Inventive Coating Composition A | Inventive Coating Composition B | Vista Aqua Fusion | Benjamin Moore High Gloss Advance | Dulux Advanced Oil |
|---|---|---|---|---|---|
| Scrub Resistance, # cycles | 839 | 927 | 126 | 214 | 228 |
| Std. Dev. | 113 | 53 | 20 | 20 | 39 |

Test Methods

Test methods include the following:

Acid Value Determination

A 1~2 g sample of alkyd was removed from the reactor using a glass pipette and weighed into a 250 mL Erlenmeyer flask. To the flask, 25 mL of 50/50 isopropanol/xylenes mixture was added along with a stir bar. The flask was placed on a stirrer/hot plate and allowed to mix with gentle heating until the material was dissolved. Then, a few drops of phenolphthalein indicator solution were added to the flask and the contents titrated to the phenolphthalein endpoint using 0.1N potassium hydroxide in methanol. The AV was then calculated according to the following formula:

$$AV = \frac{\text{mL titrant} \times 56.1 \times \text{normality of titrant}}{\text{sample weight in grams}}$$

Open time refers to the length of time a formulated dispersion remains wet or open enough to allow for brush-in and repair. An ASTM test to determine open time does not exist. The open time was determined by casting a uniform film on a Leneta panel, 8×11 inches, and making a mark on the coating to simulate a defect that is brushed over at various time intervals. The effectiveness of removing the original mark by brushing is determined and the open time corresponds to the time until which the mark can still be removed.

Grain raising is a problem with water borne coatings and is due to the absorption of water by the cell wall fragments on the surface of the wood resulting in the surface fibers (whiskers) of the wood that stand up from the wood surface creating a rough texture. An ASTM test method to characterize the severity of grain raising does not exist.

Grain raising was determined by applying a coating to southern yellow pine, an uneven grained wood with prominent grains and distinct growth rings, comprising a light soft layer of early wood followed by a dense dark layer of latewood. The dispersion penetrates the early wood more than the late wood due to the higher porosity resulting in a lower gloss reading that is indicative of increased grain raising. Grain raising was determined qualitatively by visual and tactile ratings and quantitatively from gloss measurements.

Tannin stain blocking resistance measures the capability of the coating to block water soluble tannin & other natural wood stains from bleeding through to the topcoat. A modified version of ASTM D6686, Test Method for Evaluation of Tannin Stain Resistance of Coatings was used.

The tannin block test involved painting a white primer formulated from the alkyd dispersion over redwood or western red cedar (woods with high tannin content), curing for 24 hrs, top coating with a white exterior paint and curing again for 24 hrs. The Y reflectance was determined by a BYK Gardner Color View spectrophotometer. The boards were placed in a high humidity Cleveland condensation tester at 100° F. for 96 hrs, cooled and dried and the reading was retaken at the same location and the ratio of final to initial reflectance (due to the bleed-through of the tannin which discolors the coating) was determined for the primer and topcoat.

Scrub Resistance Test Method

This test (based on ASTM D 2486-00) was performed as follows:

A. Preparation of Apparatus:

25 Abrasion Tester—An abrasion testing device was used which consists of a brush clamped into a bracket which is moved back and forth over the dried, applied paint film by means of a set of cables on either side. The abrasion tester was leveled before use and operated at 37±1 cycles/minute. Brush—The bristles, if new, were leveled before use to permit uniform wear on the paint surface. Leveling was accomplished by running the brush over 100 or 120 mesh Aluminum Oxide close grain sandpaper.

B. Test:

5 The coating was drawn down on a black vinyl chart (Type P-121-10N, The Leneta Company) using the 7 mil opening of a 7/10 Dow film caster, starting from the secured end of the panel. The time for application was 3 to 4 seconds from end to end. The coating was air dried in a horizontal position for 7 days in an open room kept at 73.5+/−3.5° F. and 50+/−5% relative humidity. Two drawdowns of each sample were made. Each drawdown is cut in half and all four are tested.

The drawdown was secured to the abrasion tester by using a gasketed frame and brass weights or clamps. The brush was mounted in the holder. 10 g of a scrub medium (Abrasive Scrub Medium, Type SC-2, The 15 Leneta Company) was spread evenly on the brush bristles. The brush was placed at the center of the path. The brush was bristle side up when applying the scrub medium and water, then carefully turned bristle-side down when starting the test. After each 400 cycles before failure, the brush was removed but not rinsed; 10 g of stirred scrub medium added; and the brush replaced. 5 20 ml of water was placed on the brush before continuing. The number of cycles to remove the paint film fully in one continuous line was recorded.

Gloss measures the reflectivity of a surface at a specified angle of reflection. The coating gloss was determined per ASTM D523 using a BYK Gardner multi angle gloss meter at 20 and 60 degrees.

Average particle size diameter may be measured via light scattering using a particle size analyzer or by electron microscopy using Transmission Electron Microscopy (TEM) or Scanning Electron Microscopy (SEM).

Particle Size Analyzer

A Beckman Coulter LS230 particle size analyzer was used with a Small Volume Module as the sample delivery system. The software version utilized was Version 3.29. Hardware and software were obtained from Beckman Coulter Inc., Miami, Fla.

The analysis conditions for all measurements used a fluid refractive index of 1.332, a sample real refractive index of 1.5, and a sample imaginary refractive index of 0.0. The extended optical model was not employed. The polarization intensity differential scattering (PIDS) option was activated and used to generate the particle size information. The average particle size diameter was measured and reported in μm.

Electron Microscopy (1) TEM

The samples are first diluted with distilled water (1 drop latex to 10 mL of D.I. water) then a ~5 μL drop is placed onto a Formvar (polyvinyl formal) coated TEM grid and allowed to air dry. The samples are examined with a JEOL JEM-1230 TEM operating at an accelerating voltage of 120 kV using either the standard specimen holder or using the cryo-stage at −120° C. Digital images are acquired with a Gatan Multiscan 794 CCD camera with a resolution of 1024×1024 pixels and processed with Adobe Photoshop 5.0. Image analysis is done using ImageJ software. A threshold is applied to gray-scale images, agglomerates are separated using a watershed function, and particle areas are measured. Particle areas are converted to equivalent diameters via the equation diameter=2*sqrt(Area/π). Particles with a diameter ranging from ~3 nm to 3 μm can be measured by TEM techniques.

(2) SEM

The samples are diluted with deionized water, and then are dropped onto a fragment of clean silicon wafer and dried at room temperature. After they are sputter coated with 10 nm of osmium they are imaged in an FEI Nova NanoSEM field emission gun scanning electron microscope at 3 to 5 keV. Image analysis is done using ImageJ software. A threshold is applied to gray-scale images, agglomerates are separated using a watershed function, and particle areas are measured. Areas were converted to diameters via the equation diameter=2*sqrt(Area/π). Diameters ~50 nm to 50 μm can be measured.

Viscosity of alkyd dispersion in water may be measured via Brookfield viscometer, at 20 rpm and 21° C.

Heat Age Stability is determined by re-measuring (after a specified temperature and time cycle) the particle size and solids content of the dispersion to determine if a change has occurred. The dispersion samples were placed in a glass jar with a plastic lid. The jar was placed inside an oven set at a temperature of 50° C. and allowed to sit for up to 12 weeks. At the end of the time period, if no settling/separation of the dispersion was visible to the eye, the particle sizes of the samples were re-measured using the same procedure as outlined previously.

Viscosity of Alkyd Resins in the Melt

Viscosity measurements of the alkyd polymer were taken using a TA Instruments AR 2000 rheometer. A sample of alkyd polymer is analyzed by flow rheometry using parallel plate geometry at a specified temperature. Viscosity is calculated from measured torque and is based on calibrated instrumental factors specific to test geometry, and the measured shear rate of 0.10/sec.

The present invention may be embodied in other forms without departing from the spirit and the essential attributes thereof, and, accordingly, reference should be made to the appended claims, rather than to the foregoing specification, as indicating the scope of the invention.

We claim:

1. An aqueous, high-solid, solvent-free alkyd dispersion comprising:
   from 40 to 70 percent by weight of one or more alkyds based on the total weight of the dispersion, wherein each said one or more alkyds has an acid value of less than 20 and a molecular weight ($M_n$) in the range of greater than 1000 Dalton;
   from less than 10 percent by weight of one or more surfactants, based on the total weight of the dispersion; and
   from 30 to 55 percent by weight of water, based on the total weight of the dispersion;
   wherein said dispersion has an average particle size diameter in the range of 0.05 to 5 µm and a viscosity in the range of 100 to 10,000 cP.

2. The aqueous alkyd dispersion according to claim 1, wherein said one or more alkyds are neutralized up to 100 percent by a neutralizing agent.

3. The aqueous alkyd dispersion according to claim 1, wherein said one or more alkyds are neutralized up to 200 percent by a neutralizing agent.

4. A solvent-free continuous process for producing an aqueous alkyd dispersion comprising the steps of:
   providing one or more molten or liquid alkyds, wherein each said one or more molten or liquid alkyds has an acid number of less than 20 and a molecular weight ($M_n$) in the range of greater than 1000 Dalton;
   providing one or more surfactants;
   providing water;
   optionally providing one or more neutralizing agents;
   continuously emulsifying said one or more molten or liquid alkyds in the water in the presence of said one or more surfactants and optionally said one or more neutralizing agents;
   thereby producing a high internal phase emulsion;
   providing additional water;
   contacting said high internal phase emulsion with said additional water;
   thereby producing said aqueous alkyd dispersion, wherein said alkyd dispersion comprises from 40 to 70 percent by weight of said one or more alkyds, from less than 10 percent by weight of said one or more surfactants, wherein said dispersion has an average particle size diameter in the range of from 0.05 to 5 µm and a viscosity in the range of 100 to 10,000 cP.

5. The continuous process for producing an aqueous alkyd dispersion according to claim 4, wherein said one or more alkyds are neutralized up to 100 percent by a neutralizing agent.

6. The continuous process for producing an aqueous alkyd dispersion according to claim 4, wherein said one or more alkyds are neutralized up to 200 percent by a neutralizing agent.

7. The process of claim 4, wherein the aqueous alkyd dispersion has a solid content of greater than 60 weight percent, based on the weight of the dispersion.

8. The process of claim 4, wherein aqueous alkyd dispersion has a solid content of greater than 65 weight percent, based on the weight of the dispersion.

9. The process of claim 4, wherein aqueous alkyd dispersion has a solid content of greater than 70 weight percent, based on the weight of the dispersion.

10. The process of claim 4, wherein the alkyd resin has an acid number of less than 15.

11. The process of claim 4, wherein the alkyd resin has an acid number of less than 10.

12. A coating composition comprising an aqueous, high-solid, solvent-free alkyd dispersion comprising:
    from 40 to 70 percent by weight of one or more alkyds based on the total weight of the dispersion, wherein each said one or more alkyds has an acid value of less than 20 and a molecular weight (Mn) in the range of greater than 1000 Dalton;
    from less than 10 percent by weight of one or more surfactants, based on the total weight of the dispersion; and
    from 30 to 55 percent by weight of water, based on the total weight of the dispersion;
wherein said dispersion has an average particle size diameter in the range of 0.05 to 5 µm, and
wherein said dispersion has a viscosity in the range of 100 to 10,000 cP.

13. A coating made from the coating composition of claim 12.

14. A method for producing a coating with good scrub resistance comprising the steps of (1) selecting the coating composition according to claim 12, (2) formulating the coating composition into a pigmented paint, (3) thereby forming a formulated paint; (4) applying the formulated paint to one or more surfaces or structures, (5) removing a portion of water from the formulated paint associated with one or more surfaces of the article or structure and (5) thereby coating the article or structure.

* * * * *

UNITED STATES PATENT AND TRADEMARK OFFICE
CERTIFICATE OF CORRECTION

PATENT NO. : 9,200,177 B2
APPLICATION NO. : 13/498264
DATED : December 1, 2015
INVENTOR(S) : Timothy J. Young et al.

It is certified that error appears in the above-identified patent and that said Letters Patent is hereby corrected as shown below:

Title page, item (73) Assignee:

Please add an additional Assignee - "Rohm and Haas Company, Philadelphia, PA (US)"

Signed and Sealed this
Seventh Day of June, 2016

Michelle K. Lee
*Director of the United States Patent and Trademark Office*